Patented May 22, 1951

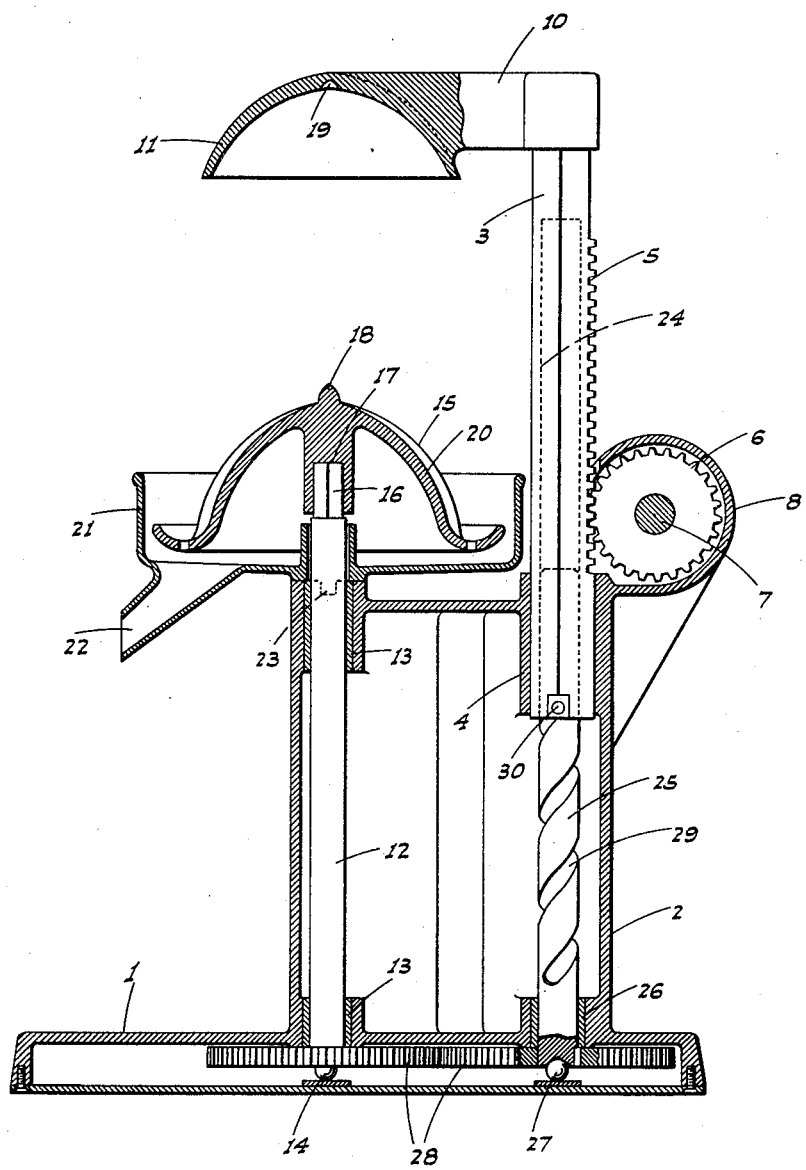

2,553,942

UNITED STATES PATENT OFFICE 2,553,942

JUICE EXTRACTOR HAVING A RECIPROCATING PRESSER CUP AND A ROTATING EXTRACTOR HEAD

Axel H. Roos, Chico, Calif.

Application June 28, 1947, Serial No. 757,723

7 Claims. (Cl. 146—3)

This invention has for an object the provision of an improved fruit juice extractor of manually actuated type.

Another object of the invention is to provide a fruit juice extractor, of the type described, including a presser cup movable toward a cooperating, semi-spherical extractor head; a novel feature being the inclusion of mechanism, responsive to manual lowering of the presser cup, to cause simultaneous rotation of said extractor head.

An additional object of the invention is to provide a fruit juice extractor, as in the preceding paragraph, wherein the device includes a hand lever, and connecting means between the hand lever and presser cup to cause lowering motion of the latter from a normally raised position; the extractor head being rotatably mounted, and there being motion translating mechanism between said connecting means and the extractor head to cause rotation of the same upon actuation of the lever to lower the presser cup.

It is also an object of the invention to provide a fruit juice extractor, as in the preceding paragraph, in which said connecting means includes a vertically movable rack bar having a vertical bore therein; said motion translating mechanism comprising a vertical spindle positioned for relative telescoping engagement in the bore of the rack bar upon lowering of the latter; said spindle having a helical groove therein and a pin on the rack bar engaging in said groove, whereby straight-line lowering motion of the rack bar is converted to rotary motion of said spindle.

A further object of the invention is to provide a simple, economical to manufacture, and practical fruit juice extractor, and one which will be exceedingly practical for the purpose for which it is designed.

These objects are accomplished by means of such structure and relative arrangement of parts as will fully appear by a perusal of the following specification and claims.

In the drawings:

Fig. 2 is a sectional elevation of the device.

Figure 1:
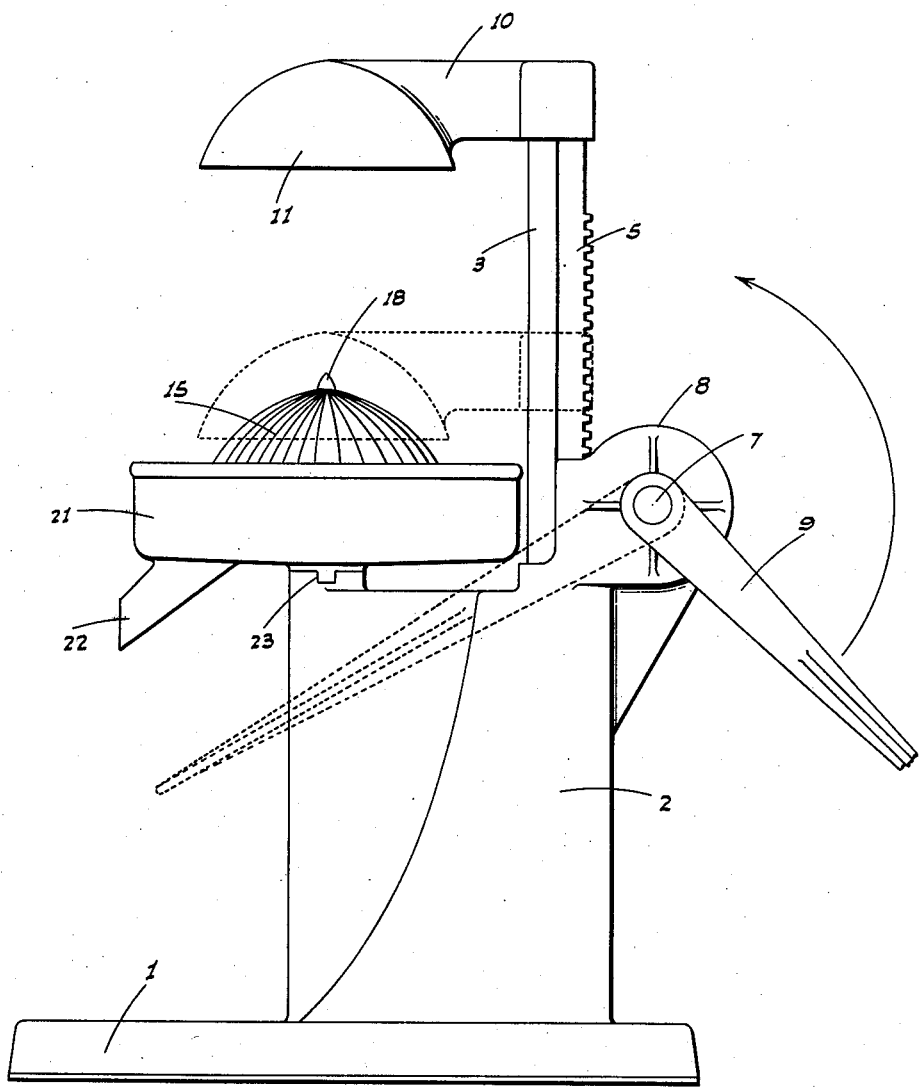
Fig. 1 is a side elevation of the improved fruit extractor.

Referring now more particularly to the characters of reference on the drawings, the improved fruit juice extractor comprises a hollow base 1 having an upstanding body 2 thereon which is also hollow.

A vertical rack bar 3 is slidably carried in, and projects above, a bearing 4 in the body 2; said rack bar 3 including a rack 5 meshing with a pinion 6 fixed on a cross shaft 7 within a protective shield 8 at the rear of the device. The cross shaft 7 and the pinion 6 are adapted to be rotated, in a direction to lower the rack bar 3, from a normally raised position by means of a hand lever or handle 9 which radiates from one end of the shaft 7, normally extending at a rearward and downward incline. It will be seen that with swinging of the handle 9 from the full line to the dotted line positions of Fig. 1, that the rack bar 3 will lower to a substantial extent.

At its upper end the rack bar 3 carries a rigid, forwardly projecting arm 10 having a downwardly opening presser cup 11 formed on its outer end. Below the presser cup 11 the body 2 is fitted with an upstanding spindle 12, hereinafter entitled the "driven" spindle, carried in a pair of vertically spaced bearings 13, and projecting, at its lower end, into the hollow base 1. Within said base the spindle 12 is supported, directly at its lower end, by a single ball bearing unit 14.

At its upper end, above the top of the body 2, the spindle 12 is fitted with an extractor head 15 of generally semi-spherical configuration; said head 15 being attached to the spindle 12 removably by means of a non-circular shank 16 engaged in a matching socket 17. At its apex the extractor head 15 is formed with an upstanding point 18 which serves to center a fruit half (such as half an orange) on said extractor head, and the presser cup 11 has a matching seat 19 therein for said point 18.

The extractor head 15 includes generally radial extractor ribs 20, and said head is surrounded by a circular juice catch receptacle 21 including an outlet spout 22. The catch receptacle 21 is removably mounted on the body directly at the upper end of the topmost one of the bearings 13, the point of detachment being indicated at 23.

The rack bar 3 is formed with a vertical bore 24, and another spindle 25, hereinafter entitled the "driving" spindle, projects into said bore 24 from below. The driving spindle 25, while mounted for rotary motion, is axially immovable. Adjacent its lower end the driving spindle 25 is carried in a bearing 26 and thence projects into the hollow base 1, where it is end-supported by a single ball bearing unit 27. A gear train 28 in the hollow base 1 interconnects the driving spindle 25 and the driven spindle 12 at their lower ends.

The driving spindle 25 is formed with a relatively long-pitch helical groove 29 therein, and one or more pins 30, fixed on the rack bar 3, run in such groove.

The above described fruit juice extractor functions as follows:

Firstly, a fruit half is placed upside down on the extractor head 15, and thereafter the handle 9 is actuated to cause lowering of the rack bar 3 and the presser cup 11; the presser cup engaging the fruit half and urging it forcefully onto the extractor head 15.

As the rack bar 3 moves downward, as above, the assembly of pin 30 and helical groove 29 convert the vertical lineal motion of said rack bar into rotary motion of the driving spindle 25. This rotary motion is in turn imparted to the driven spindle 12 and extractor head 15 by the gear train 28.

As a consequence, the extractor head 15 is forcefully rotated, automatically, each time that the presser cup 11 is manually lowered for engagement with, and to force a fruit half onto, said extractor head 15. This is an important feature, as it assures full juice extraction by reason of the effective rotary squeezing of all of the pulp. Also, by reason of the rotation of the head during the pressing operation, there is less tendency to turn the pulp out, and further there is no squeezing of the bitterness from the rind, as the pressure may be less than with other types of manual fruit juice extractors wherein the extractor head is stationary.

The upstanding point 18, in addition to initially centering the fruit half, prevents it from slipping laterally and becoming misalined on the extractor head 15.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. A fruit juice extractor comprising a body having a base, a vertical spindle journaled on the body, an exposed extractor head on the upper end of the spindle, a presser cup above the extractor head in cooperating relation, a vertical movable rack bar supporting the presser cup for lowering relative to the extractor head, hand means to actuate the rack bar, and means responsive to lowering of the rack bar arranged to translate vertical lineal motion thereof to rotary motion, and to rotate said spindle; said last named means including another spindle journaled on the body directly below the rack bar, the latter having a bore in which said other spindle slidably engages, a helical groove formed in the last named spindle, a pin on the rack bar projecting into said groove, and a gear means connecting the last named spindle in driving relation with the first named spindle.

2. A fruit juice extractor comprising a body having a base, a vertical spindle journaled on the body, an exposed extractor head on the upper end of the spindle, a presser cup above the extractor head in cooperating relation, a vertical movable rack bar supporting the presser cup for lowering relative to the extractor head, hand means to actuate the rack bar, and means responsive to lowering of the rack bar arranged to translate vertical lineal motion thereof to rotary motion, and to rotate said spindle; said last named means including another spindle journaled on the body directly below the rack bar, the latter having a bore in which said other spindle slidably engages, a helical groove formed in the last named spindle, a pin on the rack bar projecting into said groove, the base being hollow and both spindles projecting thereinto, and a gear train in the hollow base connecting said spindles.

3. A fruit juice extractor comprising a body having a base, a vertical spindle journaled on the body, an exposed extractor head on the upper end of the spindle, a presser cup above the extractor head in cooperating relation, a vertical movable rack bar supporting the presser cup for lowering relative to the extractor head, hand means to actuate the rack bar, and means responsive to lowering of the rack bar arranged to translate vertical lineal motion thereof to rotary motion, and to rotate said spindle; said last named means including another spindle journaled on the body directly below the rack bar, the latter having a bore in which said other spindle slidably engages, a helical groove formed in the last named spindle, a pin on the rack bar projecting into said groove, and a gear train connecting said spindles.

4. A fruit juice extractor comprising a body having a base, a vertical spindle journaled on the body, an exposed extractor head on the upper end of the spindle, a presser cup above the extractor head in cooperating relation, a vertical movable rack bar supporting the presser cup for lowering relative to the extractor head, hand means to actuate the rack bar, another spindle journaled on the body directly below the rack bar, the latter having a bore in which said other spindle slidably engages, and a pin and helical groove arrangement between said bar and other spindle; said pin and helical groove being operative to translate vertical lineal motion of the rack bar to rotary motion of said other spindle, and driving connections between said other spindle and the first named spindle.

5. A fruit juice extractor comprising a body, having a base, a vertical spindle journaled on the body, an exposed extractor head on the upper end of the spindle, a presser cup above the extractor head in cooperating relation, a vertical movable rack bar supporting the presser cup for lowering relative to the extractor head, hand means to actuate the rack bar, another spindle journaled on the body directly below the rack bar, the latter having a bore in which said other spindle slidably engages, and a pin and helical groove arrangement between said bar and other spindle; said pin and helical groove being operative to translate vertical lineal motion of the rack bar to rotary motion of said other spindle, and driving connections between said other spindle and the first named spindle, the driving connections being a gear train.

6. A fruit juice extractor comprising a hollow body, a hollow base supporting the body, two pairs of vertical spaced bearings within the body, a spindle journaled in each pair of bearings and projecting into the base at their lower ends and out of the body at their upper ends, a ball bearing interposed between the lower end of each spindle and the bottom wall of the base, a train of gears within the base and connecting the spindles in driving relation with each other, a juice extractor head mounted on the upper end of the one spindle for rotation therewith, the other spindle being provided with a helical groove in its outer circumference, a vertical element having a central bore, such element being slidably fitted over the upper end of said last named spindle, a pin projecting into the bore and fitted into said groove, means to move said element vertically, an outwardly projecting arm on the outer end of said element, and a presser cup mounted on the arm and disposed co-axially with the extractor head.

7. A fruit juice extractor comprising a body having a base, a vertical rotary spindle journaled on the body, an exposed extractor head on the upper end of the spindle, a presser cup above the extractor head in cooperating relation, a vertically movable rack bar supporting the presser cup for lowering relative to the extractor head, hand means to actuate the rack bar, and engaged direct driving connections between the vertically movable rack bar and rotary spindle; said connections including a mechanical motion transmitting means directly driven by the rack bar, to convert the vertical motion of the bar into a rotary motion about a vertical axis, and means to impart said rotary motion about a vertical axis to a similar motion of the vertical spindle.

AXEL H. ROOS.

REFERENCES CITED

The following references are of record in the file of this patent:

UNITED STATES PATENTS

| Number | Name | Date |
|---|---|---|
| 42,336 | Ashe | Apr. 19, 1864 |
| 1,053,590 | Gilchrist | Feb. 18, 1913 |
| 1,115,754 | Walker | Nov. 3, 1914 |
| 1,762,355 | Deleray | June 10, 1930 |
| 2,010,491 | Kaefer, Jr. | Aug. 6, 1935 |
| 2,017,960 | Faulds | Oct. 22, 1935 |
| 2,109,653 | Scurlock | Mar. 1, 1938 |
| 2,404,382 | Klein | July 23, 1946 |

FOREIGN PATENTS

| Number | Country | Date |
|---|---|---|
| 315,603 | Italy | Mar. 2, 1934 |